US009714331B2

(12) United States Patent
Korwin-Edson et al.

(10) Patent No.: US 9,714,331 B2
(45) Date of Patent: *Jul. 25, 2017

(54) ROOM TEMPERATURE CROSSLINKED FOAM

(71) Applicant: Owens Corning Intellectual Capital, LLC, Toledo, OH (US)

(72) Inventors: Michelle L. Korwin-Edson, Pataskala, OH (US); Robert J. O'Leary, Newark, OH (US); Robert Edwin Quinn, New Albany, OH (US); Fatemeh Nassreen Olang, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,042

(22) Filed: Sep. 19, 2014

(65) Prior Publication Data
US 2015/0013880 A1 Jan. 15, 2015

Related U.S. Application Data

(63) Continuation of application No. 11/893,435, filed on Aug. 16, 2007, now abandoned, which is a continuation-in-part of application No. 11/647,747, filed on Dec. 29, 2006, now Pat. No. 8,779,016, application No. 14/491,042, which is a continuation of application No. 12/688,947, filed on Jan. 18, 2010, now Pat. No. 8,875,472, which is a continuation-in-part of application No. 11/647,747, filed on Dec. 29, 2006, now Pat. No. 8,779,016, and a continuation-in-part of application No. 11/893,451, filed on Aug. 16, 2007, now abandoned, and a continuation-in-part of application No. 11/893,474, filed on Aug. 16, 2007, and a continuation-in-part of application No. 11/893,436, filed on Aug. 16, 2007, now abandoned, and a continuation-in-part of application No. 11/893,435, filed on Aug. 16, 2007, now abandoned, and a continuation-in-part of application No. 11/977,849, filed on Oct. 25, 2007, now abandoned.

(60) Provisional application No. 61/145,740, filed on Jan. 19, 2009, provisional application No. 61/182,345, filed on May 29, 2009.

(51) Int. Cl.
| | |
|---|---|
| C08J 9/00 | (2006.01) |
| C08J 9/12 | (2006.01) |
| C08J 9/08 | (2006.01) |
| C08L 51/00 | (2006.01) |
| C08L 51/04 | (2006.01) |
| C08L 53/02 | (2006.01) |
| C08J 9/228 | (2006.01) |
| E04B 1/68 | (2006.01) |
| E04B 1/74 | (2006.01) |
| E04C 5/07 | (2006.01) |

(52) U.S. Cl.
CPC ............... *C08J 9/127* (2013.01); *C08J 9/08* (2013.01); *C08J 9/228* (2013.01); *C08L 51/003* (2013.01); *C08L 51/04* (2013.01); *C08L 53/02* (2013.01); *E04B 1/6801* (2013.01); *E04B 1/74* (2013.01); *E04C 5/07* (2013.01); *C08J 2201/022* (2013.01); *C08J 2201/026* (2013.01); *C08J 2203/12* (2013.01); *C08J 2333/00* (2013.01); *C08J 2351/08* (2013.01); *E04B 2001/742* (2013.01)

(58) Field of Classification Search
CPC ........................................................ C08J 9/127
See application file for complete search history.

(56) References Cited

U.S. PATENT DOCUMENTS

| | | | |
|---|---|---|---|
| 3,577,554 A | 5/1971 | Parrish et al. | |
| 3,617,198 A | 11/1971 | Reid et al. | |
| 3,673,133 A | 6/1972 | Schmidt | |

(Continued)

FOREIGN PATENT DOCUMENTS

| | | |
|---|---|---|
| CA | 2749850 | 7/2010 |
| CN | 1245815 | 3/2000 |

(Continued)

OTHER PUBLICATIONS

R-value_ESPEnergy, 2016.*
International Search Report and Written Opinion from PCT/US07/026433 dated May 2, 2008.
International Preliminary Report on Patentability from PCT/US07/026433.

(Continued)

*Primary Examiner* — Irina Krylova
(74) *Attorney, Agent, or Firm* — Calfee, Halter & Griswold LLP

(57) ABSTRACT

Foams for filling cavities and crevasses and for forming foamed products are provided. The latex foam may include an A-side containing a functionalized latex and a B-side that contains a crosslinking agent and optionally a non-functionalized latex. The A- and/or B-side contain a blowing agent package or components forming the blowing agent package. The blowing agent package may be the combination of two or more chemicals that when mixed together form a gas or a chemical compound that, when activated by heat or light, forms a gas. In an alternate embodiment, the latex foam includes a functionalized latex, an acid, and an encapsulated crosslinking agent and base. Alternatively, the spray latex foam may include a functionalized latex, a crosslinking agent, and an encapsulated dry acid and dry base. The encapsulating agent may be a protective, non-reactive shell that can be broken or melted at the time of application.

11 Claims, No Drawings

(56) References Cited

U.S. PATENT DOCUMENTS

| | | |
|---|---|---|
| 3,714,078 A | 1/1973 | Gordon et al. |
| 3,768,969 A | 10/1973 | Kullman et al. |
| 3,874,914 A | 4/1975 | Travis |
| 3,913,298 A | 10/1975 | Cogliano |
| 3,984,360 A | 10/1976 | Galbreath et al. |
| 3,992,558 A | 11/1976 | Smith-Johannsen et al. |
| 4,041,667 A | 8/1977 | Lindner et al. |
| 4,119,583 A | 10/1978 | Filip et al. |
| 4,203,815 A | 5/1980 | Noda et al. |
| 4,205,103 A | 5/1980 | Davis et al. |
| 4,244,901 A | 1/1981 | Wencley et al. |
| 4,263,362 A | 4/1981 | Straka |
| 4,306,548 A | 12/1981 | Cogliano |
| 4,328,319 A | 5/1982 | Osipow et al. |
| 4,350,774 A | 9/1982 | Scotti et al. |
| 4,408,018 A | 10/1983 | Bartman et al. |
| 4,430,832 A | 2/1984 | Kaiser et al. |
| 4,460,711 A | 7/1984 | Jacobsen |
| 4,490,505 A * | 12/1984 | Pendergrass, Jr. .... C08K 5/3412 252/62.54 |
| 4,644,014 A | 2/1987 | Thomson et al. |
| 4,692,473 A | 9/1987 | Wright et al. |
| 4,694,025 A | 9/1987 | Park |
| 4,737,525 A | 4/1988 | Blount |
| 4,759,956 A | 7/1988 | Amer et al. |
| 4,762,866 A | 8/1988 | Shih et al. |
| 4,773,562 A | 9/1988 | Gueret |
| 4,857,566 A | 8/1989 | Helbling |
| 4,900,762 A | 2/1990 | Broemmeisiek et al. |
| 4,904,702 A | 2/1990 | Allen |
| 4,945,120 A | 7/1990 | Kopp et al. |
| 4,977,219 A | 12/1990 | Watson, Jr. |
| 4,990,541 A | 2/1991 | Neilsen et al. |
| 5,062,878 A | 11/1991 | Tobiason |
| 5,096,616 A * | 3/1992 | Kittle .................. B01F 5/102 252/3 |
| 5,114,484 A | 5/1992 | Lynch |
| 5,127,552 A * | 7/1992 | Bauman ............... B29B 7/7668 222/132 |
| 5,165,915 A | 11/1992 | Tokubo et al. |
| 5,217,665 A | 6/1993 | Lim et al. |
| 5,218,793 A | 6/1993 | Ball |
| 5,256,400 A | 10/1993 | Froix et al. |
| 5,314,942 A | 5/1994 | Coogan et al. |
| 5,359,816 A | 11/1994 | Iacouides |
| 5,389,167 A | 2/1995 | Sperber |
| 5,398,471 A | 3/1995 | Spagnolo |
| 5,403,414 A | 4/1995 | Corston |
| 5,403,884 A | 4/1995 | Perlinski |
| 5,444,099 A | 8/1995 | Abe et al. |
| 5,505,344 A | 4/1996 | Woods |
| 5,529,245 A * | 6/1996 | Brown .................. B05B 7/1209 222/145.7 |
| 5,585,412 A | 12/1996 | Natoli et al. |
| 5,611,962 A | 3/1997 | Garcia et al. |
| 5,741,823 A | 4/1998 | Hsu |
| 5,786,398 A | 7/1998 | Hulls et al. |
| 5,883,182 A | 3/1999 | Hunt |
| 5,945,461 A | 8/1999 | Gosiewski et al. |
| 6,071,580 A | 6/2000 | Bland et al. |
| 6,125,608 A | 10/2000 | Charlson |
| 6,194,479 B1 | 2/2001 | Tabakovic |
| 6,221,464 B1 | 4/2001 | Patel et al. |
| 6,284,077 B1 | 9/2001 | Lucas et al. |
| 6,291,536 B1 | 9/2001 | Taylor |
| 6,296,795 B1 | 10/2001 | Buck |
| 6,298,619 B1 | 10/2001 | Davie |
| 6,414,044 B2 | 7/2002 | Taylor |
| 6,451,876 B1 | 9/2002 | Koshy |
| 6,537,934 B1 | 3/2003 | Yeo |
| 6,578,332 B2 | 6/2003 | Bushberger |
| 6,753,355 B2 | 6/2004 | Stollmaier et al. |
| 6,787,579 B2 | 9/2004 | Czaplicki et al. |
| 6,797,736 B1 | 9/2004 | Smiecinski et al. |
| 6,903,164 B2 | 6/2005 | Yabul et al. |
| 6,948,287 B2 | 9/2005 | Kornl |
| 7,005,457 B2 | 2/2006 | Loh et al. |
| 7,053,131 B2 | 5/2006 | Ko et al. |
| 7,385,020 B2 | 6/2008 | Anderson et al. |
| 7,652,103 B2 | 1/2010 | Kavanagh et al. |
| 8,875,472 B2 * | 11/2014 | Korwin-Edson ..... C08F 265/04 52/309.4 |
| 2002/0161063 A1 | 10/2002 | Duffy et al. |
| 2003/0060523 A1 | 3/2003 | Czaplicki |
| 2003/0118822 A1 | 6/2003 | Jahns et al. |
| 2003/0195266 A1 | 10/2003 | Mork et al. |
| 2003/0229153 A1 | 12/2003 | Stollmaier et al. |
| 2004/0131840 A1 * | 7/2004 | Ferguson .................. C08J 9/32 428/317.9 |
| 2004/0148889 A1 | 8/2004 | Bibee et al. |
| 2004/0225051 A1 | 11/2004 | Moy |
| 2005/0027025 A1 | 2/2005 | Erb et al. |
| 2005/0043423 A1 | 2/2005 | Schmidt et al. |
| 2005/0061435 A1 | 3/2005 | Everaerts et al. |
| 2005/0079352 A1 | 4/2005 | Glorioso et al. |
| 2005/0081994 A1 | 4/2005 | Beckley |
| 2005/0188649 A1 | 9/2005 | Hagen, Jr. |
| 2006/0047010 A1 | 3/2006 | O'Leary |
| 2006/0083762 A1 | 4/2006 | Brun et al. |
| 2006/0128821 A1 | 6/2006 | Owens et al. |
| 2006/0135635 A1 | 6/2006 | deVry |
| 2006/0219350 A1 | 10/2006 | Bain et al. |
| 2006/0272280 A1 | 12/2006 | Romes et al. |
| 2007/0004846 A1 | 1/2007 | Rogmann et al. |
| 2007/0234649 A1 | 10/2007 | Near et al. |
| 2007/0290074 A9 | 12/2007 | Dansizen et al. |
| 2007/0299211 A1 | 12/2007 | Chen |
| 2008/0160203 A1 | 7/2008 | O'Leary |
| 2008/0161430 A1 | 7/2008 | Korwin-Edson et al. |
| 2008/0161431 A1 | 7/2008 | Korwin-Edson et al. |
| 2008/0161432 A1 | 7/2008 | Korwin-Edson et al. |
| 2008/0161433 A1 | 7/2008 | Korwin-Edson et al. |
| 2008/0281006 A1 | 11/2008 | O'Leary et al. |
| 2009/0107066 A1 | 4/2009 | O'Leary et al. |
| 2009/0111902 A1 | 4/2009 | Korwin-Edson et al. |
| 2010/0175810 A1 | 7/2010 | Korwin-Edson et al. |
| 2010/0189908 A1 | 7/2010 | Olang et al. |
| 2010/0223870 A1 | 9/2010 | Betts |
| 2011/0123717 A1 | 5/2011 | O'Leary |
| 2011/0146176 A1 | 6/2011 | O'Leary |
| 2011/0224317 A1 | 9/2011 | O'Leary et al. |
| 2013/0247491 A1 | 9/2013 | Alter |

FOREIGN PATENT DOCUMENTS

| | | |
|---|---|---|
| EP | 1593727 | 11/2005 |
| EP | 1640388 | 3/2006 |
| WO | 99/42517 | 8/1999 |
| WO | 01/05886 | 1/2001 |
| WO | 01/09239 | 2/2001 |
| WO | 01/32227 | 5/2001 |
| WO | 01/55266 | 8/2001 |
| WO | 02/26873 | 4/2002 |
| WO | 02/068515 | 9/2002 |
| WO | 2005/023918 | 3/2005 |
| WO | 2006/107342 | 10/2006 |
| WO | 2007/060462 | 5/2007 |
| WO | 2007/091961 | 8/2007 |
| WO | 2007/112799 | 10/2007 |
| WO | 2008/005022 | 1/2008 |
| WO | 2008/082618 | 7/2008 |
| WO | 2008/082619 | 7/2008 |
| WO | 2008/082620 | 7/2008 |
| WO | 2008/088116 | 7/2008 |
| WO | 2010/083482 | 7/2010 |
| WO | 2010/083483 | 7/2010 |

(56) References Cited

OTHER PUBLICATIONS

International Search Report from PCT/US07/026434 dated Apr. 14, 2008.
International Search Report from PCT/US07/026435 dated Apr. 14, 2008.
International Search Report and Written Opinion from PCT/US10/021305 dated Mar. 9, 2010.
International Search Report and Written Opinion from PCT/US10/021312 dated Mar. 9, 2010.
Office action from U.S. Appl. No. 11/893,474 dated Sep. 16, 2010.
Office action from U.S. Appl. No. 11/647,747 dated Oct. 8, 2009.
Office action from U.S. Appl. No. 11/647,747 dated Apr. 26, 2010.
Office action from U.S. Appl. No. 11/647,747 dated Mar. 12, 2012.
Notice of Allowance from U.S. Appl. No. 11/647,747 dated Jun. 18, 2012.
Office action from U.S. Appl. No. 11/647,747 dated Nov. 21, 2013.
Notice of Allowance from U.S. Appl. No. 11/647,747 dated Apr. 8, 2014.
Office action from U.S. Appl. No. 11/893,435 dated Mar. 11, 2010.
Office action from U.S. Appl. No. 11/893,435 dated Sep. 17, 2010.
Office action from U.S. Appl. No. 11/893,435 dated Jun. 14, 2011.
Office action from U.S. Appl. No. 11/893,435 dated Nov. 1, 2011.
Advisory action from U.S. Appl. No. 11/893,435 dated Feb. 8, 2012.
Office action from U.S. Appl. No. 11/893,435 dated Sep. 6, 2013.
Interview Summary from U.S. Appl. No. 11/893,474 dated Dec. 9, 2013.
Office action and Interview Summary from U.S. Appl. No. 11/893,435 dated Mar. 21, 2014.
Office action from U.S. Appl. No. 11/893,436 dated Mar. 11, 2010.
Office action from U.S. Appl. No. 11/893,436 dated Sep. 20, 2010.
Office action from U.S. Appl. No. 11/893,436 dated Jun. 14, 2011.
Office action from U.S. Appl. No. 11/893,436 dated Jan. 9, 2012.
Office action from U.S. Appl. No. 11/893,474 dated Mar. 11, 2010.
Office action from U.S. Appl. No. 11/893,474 dated Sep. 18, 2015.
Office action from U.S. Appl. No. 11/893,474 dated Mar. 7, 2016.
Office action from U.S. Appl. No. 11/893,474 dated Aug. 31, 2016.
Examiner's Answer from U.S. Appl. No. 12/875,640 dated Jul. 29, 2016.
Examiner's Answer from U.S. Appl. No. 12/688,951 dated Aug. 19, 2015.
Office action from Canadian Application No. 2,749,848 dated Jul. 13, 2015.
Office action from Canadian Application No. 2,749,850 dated Sep. 22, 2015.
Hu, X. Eric, "Nucleophilic ring opening of aziridines", Tetrahedron, 60 pp. 2701-2743 (2004).
Ismail, et al., "Aziridine alkaloids as potential therapeutic agents", European Journal of Medicinal Chemistry, 44, pp. 3373-3387 (2009).
Karimova et al., "1-Alkyl-2-trifluoromethylaziridines: the basicisity and ring-opening reactions under the action of acids", Russian Chemical Bulletin, vol. 46, No. 6, Jun. 1997, 4 pgs.
Milker et al., "New Generation of Multifunctional Crosslinkers", pp. 53-80, seminar paper, published May 3-5, 2000.
Padwa, et al., "Epoxides and azirdines—A mini review" ARKIVOC, pp. 6-33, (2006).
Padwa, A., 1.01 "Aziridines and Azirines: Monocyclic", Emory University, 2008, pp. 1-105.
"Pollano, G., American Chemical Society; Division of Polymeric Materials Science and Engineering in Polymeric Materials Science and Engineering—Washington; 77; 383-384; American Chemical Society: Division of Polymeric Materials; Polymeric materials science and engineering by ACS; 1997".
Roesler, et al., "Tris-3-(1-aziridino)propionates and their use in formulated products", Progress in Organic Coatings 50, pp. 1-27 (2004).
Tymonko, "Lewis Acid Catalyzed Reactions of Aziridino—Olefins", Illinois Wesleyan University, 2001, 85 pgs.
Veitia, et al., "synthesis of novel N-protected B3-amino nitriles: study of their hydrolysis involving a nitrilase-catalyzed step", Tetrahedron: Asymmetry 20, pp. 2077-2089 (2009).
Examiner's Answer from U.S. Appl. No. 13/113,785 dated Oct. 18, 2016.
Office action from U.S. Appl. No. 11/893,474 dated Jun. 15, 2011.
Office action from U.S. Appl. No. 11/893,474 dated Nov. 1, 2011.
Advisory action from U.S. Appl. No. 11/893,474 dated Feb. 8, 2012.
Office action from U.S. Appl. No. 11/893,474 dated Sep. 6, 2013.
Interview Summary from U.S. Appl. No. 11/893,435 dated Dec. 9, 2013.
Office action and Interview Summary from U.S. Appl. No. 11/893,474 dated Mar. 18, 2014.
Office action from U.S. Appl. No. 11/893,451 dated Mar. 11, 2010.
Office action from U.S. Appl. No. 11/893,451 dated Sep. 16, 2010.
Office action from U.S. Appl. No. 11/893,451 dated Jun. 14, 2011.
Office action from U.S. Appl. No. 11/893,451 dated Jan. 9, 2012.
Office action from U.S. Appl. No. 12/688,947 dated Jun. 19, 2012.
Office action from U.S. Appl. No. 12/688,947 dated May 24, 2013.
Office action from U.S. Appl. No. 12/688,947 dated Dec. 20, 2013.
Notice of Allowance from U.S. Appl. No. 12/688,947 dated Jul. 2, 2014.
Office action from U.S. Appl. No. 12/875,640 dated Sep. 17, 2012.
Office action from U.S. Appl. No. 12/875,640 dated Apr. 17, 2013.
Office action from U.S. Appl. No. 12/875,640 dated Aug. 27, 2014.
Office action from U.S. Appl. No. 12/688,951 dated May 9, 2012.
Office action from U.S. Appl. No. 12/688,951 dated Nov. 15, 2012.
Office action from U.S. Appl. No. 12/688,951 dated Jun. 19, 2014.
Office action from U.S. Appl. No. 12/688,951 dated Nov. 21, 2014.
Office action from U.S. Appl. No. 13/113,785 dated Jan. 22, 2014.
Office action from U.S. Appl. No. 13/113,785 dated Sep. 5, 2014.
Office action from U.S. Appl. No. 11/977,849 dated Sep. 29, 2010.
Office action from U.S. Appl. No. 11/977,849 dated Mar. 4, 2011.
Office action from U.S. Appl. No. 11/977,849 dated Jul. 26, 2011.
Notice of Abandonment from U.S. Appl. No. 11/977,849 dated Aug. 21, 2012.
Office action from Australian Application No. 2010204505 dated Aug. 26, 2014.
Office action from Australian Application No. 2010204506 dated Aug. 25, 2014.
Office action from Canadian Application No. 2,709,801 dated Sep. 5, 2013.
Office action from Canadian Application No. 2,709,801 dated Aug. 18, 2014.
Office action from Chinese Application No. 200780048857.9 dated Jul. 15, 2011.
Office action from Chinese Application No. 201080008149.4 dated Oct. 18, 2012.
Office action from Chinese Application No. 201080008427.6 dated Dec. 4, 2012.
Communication from European Application No. 07868109.5 dated Nov. 11, 2009.
Response from European Application No. 07868109.5 dated Mar. 22, 2010.
Communication from European Application No. 07868109.5 dated Apr. 28, 2010.
Examination Report from New Zealand Application No. 577,570 dated Sep. 16, 2010.
Examination Report from New Zealand Application No. 594,409 dated May 18, 2012.
Examination Report from New Zealand Application No. 594,418 dated May 18, 2012.
Benzoflex 2088 Plasticizer flyer, 2010.
Cardolite NC-514 Flexible Epoxy Resin, flyer, 2009.
Ethyleneimine (Aziridine) flyer, 1992.
XAMA-7 flyer, 2003.
XAMA-7 flyer, 2004, version 2—Nov. 16, 2004, 2 pgs.

(56) References Cited

OTHER PUBLICATIONS

Office action from U.S. Appl. No. 12/875,640 dated Jan. 26, 2015.
Office action from U.S. Appl. No. 11/893,474 dated Mar. 10, 2015.
Office action from U.S. Appl. No. 13/113,785 dated Mar. 19, 2015.
Notice of Allowance from U.S. Appl. No. 11/893,474 dated Mar. 15, 2017.

* cited by examiner

ROOM TEMPERATURE CROSSLINKED FOAM

CROSS-REFERENCE TO RELATED APPLICATIONS

This application is a continuation application of U.S. Ser. No. 11/893,435 filed Aug. 16, 2007 which is a continuation-in-part of U.S. patent application Ser. No. 11/647,747, entitled "Spray-In Latex Foam For Sealing And Insulating" filed on Dec. 29, 2006, now U.S. Pat. No. 8,779,016 and is a also a continuation of Ser. No. 12/688,947 filed Jan. 18, 2010. U.S. Ser. No. 12/688,947 is a continuation-in-part of U.S. Ser. No. 11/893,451, filed Aug. 16, 2007, Ser. No. 11/893,474, filed Aug. 16, 2007, Ser. No. 11/893,436, filed Aug. 16, 2007, Ser. No. 11/893,435, filed Aug. 16, 2007 and Ser. No. 11/977,849 filed Oct. 25, 2007. U.S. patent application Ser. No. 12/688,947 claims the benefit of U.S. Provisional Application Ser. Nos. 61/145,740, filed Jan. 19, 2009 and 61/182,345, filed May 29, 2009. The instant application claims priority to the entire contents of each application identified above and is expressly incorporated herein by reference in their entirety.

TECHNICAL FIELD AND INDUSTRIAL APPLICABILITY OF THE INVENTION

The present invention relates generally to safe foams and, more particularly, to foams formed from latex that are used to fill cavities, cracks, and crevasses to enhance the sealing and insulating properties of buildings, cars, and appliances and to form backing for carpets, cushions, mattresses, pillows, and toys. Methods of making such foams are also provided.

BACKGROUND OF THE INVENTION

Spray foams have found widespread utility in the fields of insulation and structural reinforcement. For example, spray foams are commonly used to insulate or impart structural strength to items such as automobiles, hot tubs, refrigerators, boats, and building structures. In addition, spray foams are used in applications such as cushioning for furniture and bedding, padding for underlying carpets, acoustic materials, textile laminates, and energy absorbing materials. Currently, spray foams, especially those used as insulators or sealants for home walls, are polyurethane spray foams.

Polyurethane spray foams and their methods of manufacture are well known. Typically, polyurethane spray foams are formed from two separate components, commonly referred to as an "A" side and a "B" side, that react when they come into contact with each other. The first component, or the "A" side, contains an isocyanate such as a di- or poly-isocyanate that has a high percent of NCO (nitrogen, carbon and oxygen) functional groups on the molecule. The second component, or "B" side, contains nucleophilic reagents such as polyols that include two or more hydroxyl groups, silicone-based surfactants, blowing agents, catalysts, and/or other auxiliary agents. The nucleophilic reagents are generally polyols, primary and secondary polyamines, and/or water. Preferably, mixtures of diols and triols are used to achieve the desired foaming properties. The overall polyol hydroxyl number is designed to achieve a 1:1 ratio of first component to second component (A:B).

The two components are typically delivered through separate lines into a spray gun such as an impingement-type spray gun. The first and second components are pumped through small orifices at high pressure to form separate streams of the individual components. The streams of the first and second components intersect and mix with each other within the gun and begin to react. The heat of the reaction causes the temperature of the reactants in the first and second components to increase. This rise in temperature causes the blowing agent located in the second component (the "B" side) to vaporize and form a foam mixture. As the mixture leaves the gun, the mixture contacts a surface, sticks to it, and continues to react until the isocyanate groups have completely reacted. The resulting resistance to heat transfer, or R-value, may be from 3.5 to 8 per inch.

There are several problems associated with conventional polyurethane spray foams. For example, although sealing a building with such polyurethane spray foams reduces drafts and keeps conditioned air inside and external air outside of a building, there is a reduction in the ability of moisture to penetrate the building. As a result, the levels of moisture and air pollutants rise in these tightly sealed buildings that no longer permit moisture penetration into the building.

Another problem associated with conventional polyurethane spray foams is that the first component (the "A" side) contains high levels of methylene-diphenyl-di-isocyanate (MDI) monomers. When the foam reactants are sprayed, the MDI monomers form droplets that may be inhaled by workers installing the foam if stringent safety precautions are not followed. Even a brief exposure to isocyanate monomers may cause difficulty in breathing, skin irritation, blistering and/or irritation to the nose, throat, and lungs. Extended exposure of these monomers can lead to a sensitization of the airways, which may result in an asthmatic-like reaction and possibly death.

An additional problem with such conventional polyurethane spray foams is that residual polymeric methylene-diphenyl-di-isocyanate (PMDI) that is not used is considered to be a hazardous waste. PMDI typically has an NCO of about 20%. In addition, PMDI can remain in a liquid state in the environment for years. Therefore, specific procedures must be followed to ensure that the PMDI waste product is properly and safely disposed of in a licensed land fill. Such precautions are both costly and time consuming.

In this regard, attempts have been made to reduce or eliminate the presence of isocyanate and/or isocyanate emission by spray foams into the atmosphere. Examples of such attempts are set forth below.

U.S. Patent Publication No. 2006/0047010 to O'Leary teaches a spray polyurethane foam that is formed by reacting an isocyanate prepolymer composition with an isocyanate reactive composition that is encapsulated in a long-chain, inert polymer composition. The isocyanate prepolymer composition contains less than about 1 wt % free isocyanate monomers, a blowing agent, and a surfactant. The isocyanate reactive composition contains a polyol or a mixture of polyols that will react with the isocyanate groups and a catalyst. During application, the spray gun heats the polymer matrix, which releases the polyols and catalyst from the encapsulating material. The polyols subsequently react with the isocyanate prepolymer to form a polyurethane foam.

U.S. Pat. No. 7,053,131 to Ko, et al. discloses absorbent articles that include super critical fluid treated foams. In particular, super critical carbon dioxide is used to generate foams that assertedly have improved physical and interfacial properties.

U.S. Pat. No. 6,753,355 to Stollmaier, et al. discloses a composition for preparing a latex foam that includes a latex and a polynitrilic oxide (e.g., 2,4,6-triethylbenzene-1,3-dinitrile oxide) or a latex and an epoxy silane. The latex may be carboxylated. It is asserted that the composition is stable for at least twelve months and that the one-part coating systems can be cured at room temperature without the release of by-products.

U.S. Pat. No. 6,414,044 to Taylor teaches foamed caulk and sealant compositions that include a latex emulsion and a liquid gaseous propellant component. The foamed compositions do not contain a gaseous coagulating component.

U.S. Pat. No. 6,071,580 to Bland, et al. discloses an absorbent, extruded thermoplastic foam made with blowing agents that include carbon dioxide. The foam is allegedly capable of absorbing liquid at about 50 percent or more of its theoretical volume capacity.

U.S. Pat. No. 5,741,823 to Hsu teaches producing a smooth, hard coating on a wood substrate. The coating is made of a foamed, polymerized latex emulsion and is applied on the surface of a wood substrate.

U.S. Pat. No. 5,585,412 to Natoli, et al. discloses a process for preparing flexible CFC-free polyurethane foams that uses an encapsulated blowing agent. The process provides a polyurethane foam having a desired density that avoids the use of chlorofluorocarbons or other volatile organic blowing agents. The encapsulated blowing agent assertedly supplements the primary blowing action provided by water in the manufacture of water-blown polyurethane foam and facilitates in the production of foam having the desired density.

U.S. Pat. No. 4,306,548 to Cogliano discloses lightweight foamed porous casts. To manufacture the casts, expanded non-porous polystyrene foam beads or other shapes are coated with a layer of neoprene, natural rubber, or other latex. The coated polystyrene is then encased in a porous envelope, and the envelope is applied to a broken limb. Additional coated polystyrene is added over the envelope and a gaseous coagulant is added to gel the latex, which causes the polystyrene beads to adhere to each other and produce a unified, rigid structure.

Despite these attempts to reduce or eliminate the use of isocyanate in spray foams and/or reduce isocyanate emission into the air, there remains a need in the art for a spray foam that is non-toxic and environmentally friendly.

SUMMARY OF THE INVENTION

It is an object of the present invention to provide two-part foam compositions. In particular, a two-part foam composition is formed of an A-side and a B-side. The A-side of the foamable composition includes a functionalized water-dispersible resin (e.g., a functionalized latex) and/or a functionalized resin (e.g., acrylic solution and the B-side contains a crosslinking agent that crosslinks at or above room temperature and optionally, a non-reactive resin (e.g., a non-functionalized latex). In addition, the functionalized water-dispersible resin and functionalized water-soluble resin may contain from about 1.0 to about 20 wt % functional groups based on the total weight of the resin.

Additionally, either or both the A-side or the B-side may contain a blowing agent package that includes a chemical compound that, when activated by heat or by light, generates a gas. Alternatively, the A-side and the B-side may each contain blowing agent package that is formed of two components that, when reacted, forms a gas.

Further, either the A-side or the B-side may contain a plasticizer, a surfactant, a thickener, and/or an alcohol co-solvent as well as other optional additives such as foam promoters, opacifiers, accelerators, foam stabilizers, dyes (e.g., diazo or benzimidazolone family of organic dyes), color indicators, gelling agents, flame retardants, biocides, fungicides, algaecides, fillers (aluminum tri-hydroxide (ATH)), and/or conventional blowing agents.

The inventive foams can be used in any application where a flexible foam is required. Such as spray, molding, extrusion, and injection molding (e.g., reaction injection molding (RIM)) applications. The foam may be used to fill cavities, cracks, and crevasses to enhance the sealing and insulating properties of buildings, cars, and appliances or to form backing for carpets. The foam may be used in insulation or acoustical applications and in any application where polyurethane foam may be advantageous. Such uses include, but are not limited to, residential and commercial buildings, automobiles, appliances, and aircraft.

The foam may be used in automotive applications such as automotive seating, head liner panels, and in sound dampening applications under the body of the vehicle or in the engine compartment. The foam can also be used to replace masticated rubber.

The foam of the present invention can also be used in furniture applications such as cushions, mattresses, topper pads for mattresses, furniture arms and backs, seat cushions, and pillows.

The foam of the present invention may be used in consumer products and personal products. Such examples include display and cushion packaging, toys, novelty items, mops and sponges, retail and promotional items, perishable goods packaging and cosmetic applicators.

The foam of the present invention may also be used in medical applications such as for lightweight casts and as protection for medical instruments. The foam may also be used in the textile industry as clothing and as padding in clothing.

The foam of the present invention may be used in the building materials industry as an acoustical and/or thermal insulation in residential or commercial applications. Examples include as a spray-on house wrap and as a spray on stud facing to permit the adhesion of batts and vapor barrier to the foam. The foam may be affixed to wood we and act as a means to adhere a plastic vapor barrier material. The foam may also be manufactured into a foam tape which is particularly useful in sealing windows and/or doors.

The foam of the present invention may be used in industrial applications such as in filtration, as filtration media, as an anti-static grade, as protective packaging and to provide a cushioned coating on substrates.

In any of the aforementioned applications, the foam may be layered with other materials to form a composite to provide enhanced acoustical, thermal or cushioning properties. For example, the foam can be used with wood, flexible and/or rigid foam, insulation (acoustical/thermal), metal, fabrics, plastic, and combinations thereof.

The inventive foams do not release any harmful vapors into the air when applied or sprayed. Consequently, the foams reduce the threat of harm to individuals working with or located near the foam and can be used in the renovation market, as well as in houses that are occupied by persons or animals.

It is another object of the present invention to provide one-part foam compositions. Generally, the inventive foam compositions contain a functionalized water-dispersible resin (e.g., a functionalized latex) and/or a functionalized water-soluble resin (e.g., acrylic solution), a crosslinking agent that crosslinks at or above room temperature, and a blowing agent package. The blowing agent package is a combination of two or more chemicals that when mixed together form a gas, such as, for example, an acid and a base.

Although there are numerous types of functionalized water-dispersible resins that may be used in the aqueous latex solution of the latex foam composition, the preferred functionalized water-dispersible resin is a functionalized latex. The functionalized water-dispersible resin and water-soluble resin may contain from about 1.0 to about 20 wt % functional groups based on the total weight of the resin. Optionally, a plasticizer, a surfactant, a thickener, an alcohol co-solvent, foam promoters, opacifiers, accelerators, foam stabilizers, dyes (e.g., diazo or benzimidazolone family of organic dyes), color indicators, gelling agents, flame retardants, biocides, fungicides, algaecides, fillers (aluminum tri-hydroxide (ATH)), and/or conventional blowing agents may be included in the foamable one-part composition. In one exemplary embodiment of the one-part foam composition, a dry acid and a dry base (i.e., the blowing agent package) are encapsulated in one or two protective, non-reactive shells that can be broken or melted at the time of the application of the foam. In a separate embodiment, the crosslinking agent and either the acid or the base are encapsulated in an encapsulating shell. Other non-limiting, exemplary one-part foam embodiments of the present invention include a foamable composition where the acid or the base is encapsulated or every component but the functionalized water-dispersible resin (e.g., a functionalized latex) and/or a functionalized water-soluble resin is encapsulated. The protective, encapsulating shell(s) may be heat activated, shear activated, photo-activated, sonically destructed, or activated or destroyed by other methods known to those of skill in the art. In use, the inventive foams may be sprayed into either an open cavity, such as between wall studs, into a closed cavity where it expands to seal any open spaces, or it may be used as a sealant to air infiltration by filling cracks and/or crevices in a building's roof or walls. Desirably, the application of the foam is a continuous spray process. Alternatively, the foam may be added to a mold and used to form items such as cushions, mattresses, pillows, and toys.

It is yet another object of the present invention to provide a method of forming a foam from a two-part foamable composition according to the present invention. To form such a two-part foam, the components of the A-side and the components of the B-side as described above are delivered through separate lines into a spray gun, such as an impingement-type spray gun. The components of the A-side and the components of the B-side are pumped through separate small orifices at high pressure to form streams of the components of the A-side and the B-side. The streams of the A- and B-side components intersect and mix with each other within the gun and begin to react. Specifically, when the A-side and B-side components meet, the blowing agent package reacts or degrades to form a gas and the crosslinking agent simultaneously reacts with the functional groups on the functionalized resin to support the foamed structure. The foaming reaction occurs until all of the blowing agent(s) have been reacted and no more gas is generated. The crosslinking of the functional groups on the functionalized resin quickly builds strength in the foam and permits the foam to withstand the force of gravity when it is placed, such as, for example, in a vertical wall cavity during application. The final foamed product becomes cured to the touch within minutes after application. In exemplary foamed products, the foam hardens within 2 minutes. The resulting resistance to heat transfer, or R-value, may be from about 3.5 to about 8 per inch.

It is also an object of the present invention to form a molded product using a two-part foam composition according to the instant invention. In particular, the A-side components and the B-side components of the two-part foam composition discussed in detail above are combined to form a reaction mixture. The reaction mixture formed of the A-side components and B-side components are added to a mold, where the reaction mixture reacts without any physical or other interference. Specifically, the blowing agent(s) reacts or degrades to form a gas while the crosslinking agent and the functionalized latex react to support the foamed structure. The crosslinking reaction and the gas generation occur simultaneously or nearly simultaneously. The foaming reaction occurs until all of the blowing agent(s) have reacted or degraded and no more gas is generated. When the foam is hardened (i.e., cured), it is released from the mold in the shape of a desired product. The curing takes place in a matter of minutes, typically less than about two minutes.

It is a further object of the present invention to provide a method of making a foam from a one-part foam composition according to the instant invention. As discussed above, the one-part foam compositions generally contain a functionalized water-dispersible resin (e.g., a functionalized latex) and/or a functionalized water-soluble resin (e.g., acrylic solution), a crosslinking agent that crosslinks at or above room temperature, and a blowing agent package. The blowing agent package is a combination of two or more chemicals that when mixed together form a gas, such as, for example, an acid and a base. To form a foam from a one-part foam composition according to the present invention, non-encapsulated materials (such as the functionalized water-dispersible and/or water-dispersible resin) are mixed with encapsulated materials (such as the crosslinking agent and blowing agent package) to form a dispersion or reaction mixture. The reaction mixture is substantially non-reactive due to the encapsulation and/or separation of reactive components within the foamable composition. Consequently, the foamable one-part foam composition is stable for extended periods of time. A single stream of the reaction mixture may be fed into an application gun that has the ability to mix the dispersion within the gun. Once the dispersion is inside the gun, the encapsulated component(s) are released, and the acid and the base (i.e., the blowing agent package) react to generate a gas ($CO_2$) and the crosslinking agent reacts with the functional groups on the resin to support the foamed structure. The simultaneously reacting mixture may be sprayed from the gun to a desired location where the mixture continues to react and form either open or closed cell foams. The foaming reaction occurs until all of the acid and base have been reacted and no more gas is generated. The final foamed product becomes cured to the touch within minutes after application. In exemplary foamed products, the foam hardens in less than about 2 minutes. The foam may have an R-value from about 3.5 to about 8 per inch.

It is an advantage of the present invention that the inventive foams do not contain the harmful chemicals found in conventional polyurethane spray foams, such as, for example, MDI monomers. As a result, the foams of the present invention do not contain harmful vapors that may cause skin or lung sensitization or generate toxic waste. Additionally, the foams do not emit harmful vapors into the air when the foam is sprayed, such as when filling cavities to seal and/or insulate a building. The inventive foams are safe for workers to install and, therefore, can be used both in the house renovation market and in occupied houses. Additionally, because there are no harmful chemicals in the inventive foams, the foams can be safely disposed without having to follow any stringent hazardous waste disposal precautions.

It is another advantage of the present invention that the foams may be applied using existing spray equipment designed for conventional two-part spray polyurethane foam systems without clogging the spray equipment. Thus, the application gun is capable of repeated use without clogging and the resulting necessary cleaning when the foams of the present invention are utilized.

It is yet another advantage of the present invention that the use of an alcohol co-solvent to partially replace the water in the serum allows for a faster drying/curing of the foam and improves cell structure.

It is a further advantage of the present invention that the components of the foam compositions may be carefully chosen to result in a tacky or sticky foam that can be used to hold the fiberglass batt in place when used to fill cracks or crevasses.

It is also an advantage of the present invention that the components of the one-part foam compositions in which the crosslinking agent and base or the acid and base are encapsulated may be mixed and stored in one container without significant reaction until the composition is used.

It is a feature of the present invention that the foam compositions may be used to fill open or closed cavities or to fill cracks and crevasses.

It is also feature of the present invention that the foam compositions may be one or two part compositions.

It is another feature of the present invention that the dry acid and dry base forming the blowing agent can be encapsulated in a single encapsulant.

It is a further feature of the present invention that the dry acid and dry base forming the blowing agent can be encapsulated in separate encapsulating materials.

It is yet another feature of the present invention that blowing agent or components forming the blowing agent may be encapsulated a wax, a gelatin, a low melting, semi-crystalline, super-cooled polymer such as polyethylene oxide or polyethylene glycol, or a polymer or acrylic that can be broken at the time of the application of the foam.

The foregoing and other objects, features, and advantages of the invention will appear more fully hereinafter from a consideration of the detailed description that follows.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references. The terms "foamable composition", and "foam composition" may be interchangeably used in this application. In addition, the terms "encapsulant" and "encapsulating material" may be used interchangeably herein.

The present invention relates to foams used to fill cavities of buildings to improve the sealing and insulation properties. Additionally, the inventive foams may be used to seal cracks and crevasses, such as those around windows and doors. The foams may also be used to form items such as cushions, carpet backing, mattresses, pillows, and toys. The inventive foams can be used in spray, molding, extrusion, and injection molding (e.g., reaction injection molding (RIM)) applications. In one exemplary embodiment, the inventive foam is formed from two components, namely, an A-side and a B-side. In particular, the A-side of the foam composition includes a functionalized water-dispersible and/or a functionalized water-soluble resin (e.g., a functionalized latex or a functionalized latex and an acrylic solution) and the B-side contains a crosslinking agent, and optionally, a non-reactive resin (e.g., a non-functionalized latex). Either or both the A-side or the B-side may contain a blowing agent package. Alternatively, the A-side and the B-side may each contain a component forming a blowing agent package. A plasticizer, a surfactant, a thickener, and/or a co-solvent may optionally be included in either the A- and/or B-side.

In an alternate embodiment, the crosslinking agent and an acid or a base are encapsulated in an encapsulating material to form a one-part foam composition. In a further alternate embodiment, the foamable composition includes a functionalized water-dispersible and/or a functionalized water-soluble resin, a crosslinking agent, and an encapsulated dry acid and/or dry base. In another exemplary embodiment, every component but the functionalized water-dispersible and/or a functionalized water-soluble resin is encapsulated. Unlike conventional spray polyurethane foams, the foams of the present invention do not contain isocyanate. Therefore, no MDI monomers are present in the inventive foams. Because the inventive foam does not contain isocyanate, no harmful chemicals are emitted during installation of the foams.

It is preferred that the foams of the present invention, as well as the components thereof, meet certain performance properties, or Fitness for Use ("FFU") criteria. In particular, the chemical property FFUs that the inventive foam should meet include the following criteria:

- The foam should adhere to various materials such as wood, metal, concrete and plastic
- The chemical constituents should be as safe as possible. If a hazardous chemical is used, it should not be introduced or atomized into the air where it can be inhaled
- The foam may be chemically foamed through the use of a blowing agent or it may be mechanically foamed with a gas
- The installer of the latex foam should be able to work with the material without any specialized personal protective equipment ("PPE"), such as a breathing apparatus, although safety glasses, dust mask, and gloves are acceptable
- The foam should not lend itself to molding or fungus growth (ASTM C1338)
- The foam should not contain a food source for insects or rodents
- There should be a minimum shelf life of the un-reacted constituents of 12 months.

It is also desirable that the inventive foams of the present invention meet certain physical property FFUs. The physical property FFUs that the inventive foam should meet include the following:

- The foam weight should be between about 0.5 and about 5.0 pounds per cubic foot
- The foam should be fluid enough to be sprayed either at room temperature or by heating (viscosity of <10,000 cP at a high shear rate)
- The foam should not sag or fall in the cavity
- The foam should fill the entire cavity or be used to coat the cavity with an air barrier Ideally, the foam should be a closed-cell variety, but an open-cell variety is acceptable if the open-cell variety is necessary to achieve the other FFUs The foam should have a thermal resistance (R-value) of at least 3.7° Fft$^2$ h/BTU per inch The foam should be non-sagging and non-dripping (i.e., fire retardant) during a fire The foam should not corrode metal objects such as screws, nails, electrical boxes, and the like Air infiltration should be negligible (ASTM E283-04) (spec 0.4 cfm/sq ft)

Water vapor infiltration should be greater then 1 perm or $5.72 \times 10^{-8}$ g/Pa-s-m$^2$ The foam should have low or no odor.

As discussed above, the A-side of the composition for the foams according to one exemplary embodiment of the present invention includes a functionalized water-dispersible and/or a functionalized water-soluble resin. Preferably, the functionalized water-dispersible resin is a functionalized latex, and even more preferably, the latex system is an acrylic emulsion. Non-limiting examples of suitable water-soluble resins for use in the inventive compositions include acrylic solutions and polyols. In addition to the functionalized water-dispersible and/or functionalized water-soluble resin, the serum can contain a polyacrylic oligomer to increase the total number of the functional groups. It is to be appreciated that although any functionalized water-soluble and/or functionalized water-dispersible resin(s) may be used as a component in the foamable compositions described herein, reference will be made to a preferred embodiment, functionalized latexes with or without an acrylic solution.

There are numerous types of latexes that may be used as the functionalized water-dispersible component in the aqueous resin solution of the present invention. Non-limiting examples of suitable latexes include natural and synthetic rubber resins, and mixtures thereof, including thermosettable rubbers; thermoplastic rubbers and elastomers including, for example, nitrile rubbers (e.g., acrylonitrile-butadiene); polyisoprene rubbers; polychloroprene rubbers; polybutadiene rubbers; butyl rubbers; ethylene-propylene-diene monomer rubbers (EPDM); polypropylene-EPDM elastomers; ethylene-propylene rubbers; styrene-butadiene copolymers; styrene-isoprene copolymers; styrene-butadiene-styrene rubbers; styrene-isoprene-styrene rubbers; styrene-ethylene-butylene-styrene rubbers; styrene-ethylene-propylene-styrene rubbers; polyisobutylene rubbers; ethylene vinyl acetate rubbers; silicone rubbers including, for example, polysiloxanes; methacrylate rubbers; polyacrylate rubbers including, for example, copolymers of isooctyl acrylate and acrylic acid; polyesters; polyether esters; polyvinyl chloride; polyvinylidene chloride; polyvinyl ethers; polyurethanes and blends; and combinations thereof, including, for example, linear, radial, star, and tapered block copolymers thereof. The preferred latex for use in the inventive foam composition is a carboxylated acrylic latex.

As discussed above, water-dispersible and water-soluble resin is functionalized. The functional group may be any functional group capable of crosslinking, including carboxylic acid, hydroxyl, methylol amide groups, and sulfonates. It is preferred that the water-dispersible and/or water-soluble resin(s) contain from about 1.0 to about 20 wt % functional groups based on the total dry weight of the resin, and even more preferably from about 2.0 to about 15.0 wt % functional groups based on the total dry weight of the resin. The functionality of the functionalized water-dispersible and/or water-soluble resin can be adjusted by adding or removing functional groups to or from the resin backbone to reach the optimum amount of crosslinking and ultimately the optimum strength and modulus of the foam. In preferred embodiments, a polyacrylic solution is added in amount sufficient to add up to about 50% carboxylate functionality to the final dry foam composition.

The B-side of the foam composition, as indicated previously, contains a crosslinking agent and optionally, a non-reactive resin such as, for example, a non-functionalized latex. In particular, the non-reactive resin is a resin that does not react with the crosslinking agent, but is otherwise non-limiting. The crosslinking agent is a compound that crosslinks at or above room temperature, such as polyfunctional aziridines (e.g., XAMA, available from Bayer Corporation). Other suitable crosslinking agents include, but are not necessarily limited to, multifunctional carbodiimides (e.g., Hardner CD, available from Rotta Corporation), melamine formaldehyde, polysiloxanes, and multifunctional epoxies (e.g., cycloaliphatic diepoxides). It is to be appreciated that when a polyfunctional aziridine (e.g., XAMA) is used as the crosslinking agent, other compounds such as plasticizers or epoxy diluents may be utilized to carry the polyfunctional aziridine and lower the viscosity of the B-side. The crosslinking agent may be present in the B-side in an amount from about 1.0 to about 30 percent by weight of the dry foam composition, preferably in an amount from about 3.0 to about 20 percent by weight. Although a mole ratio of the resin functional groups to the crosslinking agent functional groups of 1:1 is preferred, this molar ratio is variable and may encompass a wider range, such as, for example, from 0.5:1 to 2:1 to provide the optimum crosslinking in the final foam products.

Additionally, the A-side and/or B-side contains a blowing agent package. The blowing agent package may be the combination of two or more chemicals or compounds that when mixed together form a gas (e.g., an acid and a base such as are discussed below) or a chemical compound that, when heat or light activated, forms a gas. The generated gas may be $CO_2$, $N_2$, $O_2$, $H_2$, or other non-carcinogenic, gases. For instance, azodicarbonamide is a chemical compound that, upon heating, releases $N_2$ gas, and would be a suitable blowing agent in the foamable composition. Additionally, alkylsiloxanes, which may release $H_2$ when reacting with amine hardeners, may be used as a blowing agent in the instant invention. Other examples include diazo compounds (i.e., $CH_2N_2$) and aliphatic azide (i.e., R—N=N=N), which decompose on irradiation to give nitrogen gas, and 1-naphtyl acetic acid and n-butyric acid, which generate carbon dioxide ($CO_2$) upon photodecarboxylation. Phase change blowing agents such as low boiling point hydrocarbons (e.g., cyclopentane and n-pentane) and inert gases such as air, nitrogen, carbon dioxide can also be used. It is to be appreciated that the chemical compound is not a conventional blowing agent in the sense that it is a hydro-fluorocarbon (HFC) or a hydro-chloro-fluorocarbon (HCFC) blowing agent.

If the blowing agent package is a single chemical compound, the compound may be included in either the A- or the B-side. On the other hand, if the blowing agent package is formed of two compounds that react to form a gas when mixed, the two components are separated and placed with one component in the A-side and the other component in the B-side.

For instance, an acid and a base forming the blowing agent package may be separated and the acid placed in the A-side and the base placed in the B-side (or vice versa). Thus, in addition to the functionalized latex solution, the A-side may contain at least one acid. The acid may have a solubility of 0.5 g/100 g of water or greater at 30° C. Preferably, the acid is a dry acid powder with or without chemically bound water. Non-exclusive examples of suitable acids include citric acid, oxalic acid, tartaric acid, succinic acid, fumaric acid, adipic acid, maleic acid, malonic acid, glutaric acid, phthalic acid, metaphosphoric acid, or salts that are convertible into an acid that is an alkali metal salt of citric acid, tartaric acid, succinic acid, fumaric acid, adipic acid, maleic acid, oxalic acid, malonic acid, glutaric acid, phthalic acid, metaphosphoric acid, or a mixture thereof. Examples of salts which are convertible into acids include, but are not limited to, aluminum sulfate, calcium phosphate, alum, a double salt of an alum, potassium aluminum sulfate, sodium dihydrogen phosphate, potassium citrate, sodium maleate, potassium tartrate, sodium fumarate, sulfonates, and phosphates. The acid(s) may be present in an amount from about 1.0 to about 30 percent by weight of the dry foam composition, preferably in an amount from about 3.0 to about 20 percent by weight.

When the acid and base of the blowing agent package are separated and the A-side contains the acid, the B-side contains at least one base that acts as an acid sensitive chemical blowing agent. Generally, the weak base contains anionic carbonate or hydrogen carbonate, and, as a cation an alkali metal, an alkaline earth metal or a transition metal. Examples of bases suitable for use in the practice of this invention include calcium carbonate, barium carbonate, strontium carbonate, magnesium carbonate, lithium carbonate, sodium carbonate, potassium carbonate, rubidium carbonate, cesium carbonate, calcium hydrogen carbonate, barium hydrogen carbonate, strontium hydrogen carbonate, magnesium hydrogen carbonate, lithium hydrogen carbonate, sodium hydrogen carbonate, potassium hydrogen carbonate, rubidium hydrogen carbonate, cesium hydrogen carbonate, and bicarbonates and combinations thereof. In preferred embodiments, the base is sodium bicarbonate. The base may be present in an amount from about 1.0 to about 30% by weight of the dry foam composition. In preferred embodiments, the base is present in the B-side in an amount from about 3.0 to about 20% by weight of the dry foamable composition. Sodium bicarbonate and citric acid in a ratio of 7:1 to 4:1 are the preferred base and acid acting as the blowing agent package.

In addition to the components set forth above, the A-side and/or the B-side may contain one or more surfactants to impart stability to the acrylic during the foaming process, to provide a high surface activity for the nucleation and stabilization of the foam cells, and to modify the surface tension of the latex suspension to obtain a finely distributed, uniform foam with smaller cells. Useful surfactants include cationic, anionic, amphoteric and nonionic surfactants such as, for example, carboxylate soaps such as oleates, ricinoleates, castor oil soaps and rosinates, quaternary ammonium soaps and betaines, amines and proteins, as well as alkyl sulphates, polyether sulphonate (Triton X200K available from Cognis), octylphenol ethoxylate (Triton X705 available from Cognis), octylphenol polyethoxylates (e.g., Triton X110 available from Cognis), alpha olefin sulfonate, sodium lauryl sulfates (e.g., Stanfax 234 and Stanfax 234LCP from Para-Chemicals), ammonium laureth sulfates (e.g., Stanfax 1012 and Stanfax 969(3) from Para-Chemicals), ammonium lauryl ether sulfates (e.g., Stanfax 1045(2) from Para-Chemicals), sodium laureth sulfates (e.g., Stanfax 1022(2) and Stanfax (1023(3) from Para-Chemicals), and sodium sulfosuccinimate (e.g., Stanfax 318 from Para-Chemicals). The surfactant may be present in the A- and/or B-side in an amount from about 0 to about 20% by weight of the dry foam composition.

Further, either or both the A-side and B-side may contain a thickening agent to adjust the viscosity of the foam. It is desirable that the A-side and the B-side have the same or nearly the same viscosity to achieve a 1:1 ratio of the A-side components to the B-side components. A 1:1 ratio permits for easy application and mixing of the components of the A-side and B-side. Suitable examples of thickening agents for use in the foamable composition include calcium carbonate, methyl cellulose, ethyl cellulose, hydroxyethyl cellulose (e.g., Cellosize® HEC available from Union Carbide), alkaline swellable polyacrylates (e.g., Paragum 500 available from Para-Chem), sodium polyacrylates (e.g., Paragum 104 available from Para-Chem), bentonite clays, and Laponite® RD clay (a synthetic layered silicate), glass fibers, cellulose fibers, and polyethylene oxide. The Laponite® products belong to a family of synthetic, layered silicates produced by the Southern Clay Products Corporation. The Laponite® products are thixotropic agents that "virtually freeze" the foam structure while the structure is curing to prevent the structure from collapsing. As used herein, the phrase "virtually freeze" is meant to denote a previously fluid/viscous material that is now substantially immobilized by an internal scaffolding-like structure, which may be provided by a thixotropic agent. The thickening agent may be present in an amount up to about 50% by weight of the dry foam composition. Preferably, the amount of thickening agent present is about 0 to about 20% by weight, based on the dry foamable composition, depending upon the nature of the thickening agent.

A plasticizer may also, or alternatively, be present in the A-side and/or B-side to adjust the viscosity of the foam. Non-limiting examples of suitable plasticizers include phthalate ester, dimethyl adipate, dimethyl phthalate, epoxidized crop oils (e.g., Drapex 10.4, Drapex 4.4, and Drapex 6.8 available from Chemtura). The plasticizer may be present in the foamable composition in an amount from about 0 to about 20% by weight of the dry foam composition. Desirably, the plasticizer is present in an amount from about 0 to about 15% by weight.

Further, an alcohol such as ethanol or isopropanol may be present in the foam composition in the A-side and/or the B-side. The alcohol is preferably miscible with water and has a low boiling point. The alcohol acts as a co-solvent and replaces a portion of the water in the latex serum. Utilizing an alcohol co-solvent allows for a quicker drying/curing time after the foam's application. Additionally, the co-solvent assists in creating a foam with a fine cell structure. Although not wishing to be bound by theory, it is believed that the higher vapor pressure of the alcohol causes the alcohol to be driven off more quickly than the water in the latex solution, and that the alcohol carries the water molecules as the alcohol is removed. The co-solvent is used in small quantities, typically from about 1.0 to about 5.0% by weight of the foam composition.

Depending on the type of particles used in the latex solution, the A- or B-side may also include other optional, additional components such as, for example, foam promoters, opacifiers, accelerators, foam stabilizers, dyes (e.g., diazo or benzimidazolone family of organic dyes), color indicators, gelling agents, flame retardants, biocides, fungicides, algaecides, fillers (aluminum tri-hydroxide (ATH)), and/or conventional blowing agents. It is to be appreciated that a material will often serve more than one of the aforementioned functions, as may be evident to one skilled in the art, even though the material may be primarily discussed only under one functional heading herein. The additives are desirably chosen and used in a way such that the additives do not interfere with the mixing of the ingredients, the cure of the reactive mixture, the foaming of the composition, or the final properties of the foam.

To form a two-part spray foam of the present invention, the components of the A-side and the components of the B-side are delivered through separate lines into a spray gun, such as an impingement-type spray gun. The two components are pumped through small orifices at high pressure to form streams of the individual components of the A-side and the B-side. The streams of the first and second components intersect and mix with each other within the gun and begin to react. For example, if the blowing agent package is an acid and a base (with the acid contained in the A-side and the base contained in the B-side), the acid and base react to form carbon dioxide ($CO_2$) gas. If the blowing agent is a single chemical compound, it degrades to form a gas, such as $CO_2$ or $N_2$, upon the application of heat or light. In any event, the foaming reaction occurs until all of the blowing agent(s) have been reacted and no more gas is generated.

In addition, the crosslinking agent concurrently (simultaneously) reacts with the functional groups on the acrylic to support the foamed structure. The crosslinking is important for capturing the bubbles generated by the evolution of the gas in their original, fine structure before they can coalesce and escape the foam. It is to be appreciated that a fine foam structure is more desirable and more beneficial than a coarse foam structure in order to achieve high thermal performance. Additionally, the crosslinking of the functional groups on the functionalized latex quickly builds strength in the foam and permits the foam to withstand the force of gravity when it is placed, for example, in a vertical wall cavity during application. The final foamed product becomes cured to the touch within minutes after application. In exemplary foamed products, the foam hardens within about 2 minutes. The resulting resistance to heat transfer, or R-value, may be from about 3.5 to about 8 per inch.

In an alternate embodiment, the blowing agent package includes an acid and a base and the components of the B-side are encapsulated and added to the A-side, thereby creating a one-part foam composition. Specifically, the crosslinking agent and the base (i.e., acid sensitive chemical blowing agent) are encapsulated in one or two protective, non-reactive shells that can be broken or melted at the time of the application of the foam. For example, the crosslinking agent and the base may be encapsulated in a wax or gelatin that can be melted at the time of the application of the foam. Desirably, the wax has a melting point from about 120° F. to about 180° F., and more preferably has a melting point from about 120° F. to about 140° F. Alternatively, the encapsulating shell may be formed of a brittle polymer (such as a melamine formaldehyde polymer) or an acrylic that can be broken or sheared at the time of the application of the foam to initiate the foaming reaction. The protective shell(s) surrounding the crosslinking agent and base may be heat activated, shear activated, photo-activated, sonically destructed, or activated or destroyed by other methods known to those of skill in the art.

Optionally, the encapsulating material may be a low melting, semi-crystalline, super-cooled polymer. Non-limiting examples of low melting polymers include polyethylene oxide (PEO) and polyethylene glycol (PEG). A preferred low-melting polymer for use as an encapsulant is a polyethylene oxide that has an average molecular weight from about 100,000 Dalton to about 8,000,000 Dalton. Additionally, the glass transition temperature ($T_g$) of the super-cooled polymer may be adjusted to the application temperature of the reaction system by blending polymers. For example, polymer blends such as a blend of polyvinylchloride (PVC) and polyethylene oxide (PEO) may be used to "fine tune" the glass transition temperature and achieve a desired temperature at which the polymer melts or re-crystallizes to release the crosslinking agent and base. With a PVC/PEO blend, the desired glass transition temperature is a temperature between the $T_g$ of polyvinyl chloride and the $T_g$ of the polyethylene oxide and is determined by the ratio of PVC to PEO in the polymer blend. When the super-cooled polymer is heated above its glass transition temperature, such as in a spray gun, the polymer re-crystallizes and the crosslinking agent and base is expelled from the polymer. This expulsion of the crosslinking agent and base is due to the change in free volume that occurs after re-crystallization of the polymer.

The combination of the A-side components and the encapsulated crosslinking agent and blowing agent(s) may be mixed to form a dispersion (reaction mixture). The dispersion is substantially non-reactive because the crosslinking agent remains encapsulated within the encapsulating shell. The phrase "substantially non-reactive" as used herein is meant to indicate that there is no reaction or only a minimal reaction between the A-side components and the encapsulant in the dispersion. As a result, the one-part foamable reactive composition is stable for extended periods of time.

A single stream of the dispersion containing the functionalized latex, encapsulated crosslinking agent and blowing agent, and optional surfactants, plasticizers, thickening agents, and/or co-solvents may then be fed into an application gun, such as a spray gun, that has the ability to mix and/or heat the dispersion within the gun. The one-part foam of the present invention requires no expensive or complicated spraying equipment, and is a simple gun, a simple diaphragm, or drum pump. These types of guns are less likely to clog and are also easy to maintain and clean.

Once the dispersion is inside the gun, the crosslinking agent and base are released from the encapsulating material. For example, the dispersion may be heated within the gun to a temperature above the melting point of the long chain polymer or wax containing the crosslinking agent and base so that the crosslinking agent and base are released from the polymer or wax. In this example, the dispersion is heated to a temperature of about 130° F. to about 180° F. In addition, the mixing action within the gun may assist in the release of the crosslinking agent and base from the encapsulant. Alternatively, the encapsulating shell of the crosslinking agent and base may be shear activated, sonically activated, photo activated, or destroyed by any other suitable method known to those of skill in the art. Once the crosslinking agent and blowing agent package are released from the polymer shell, crosslinking between the crosslinking agent and the functional groups on the functionalized latex begins and the blowing agent concurrently degrades or reacts to form a gas to initiate the foaming reaction and form the foam. The simultaneously reacting mixture is sprayed from the gun to a desired location where the mixture continues to react and form either open or closed cell foams. The foam may have an R-value from about 3.5 to about 8 per inch. The foam is advantageously used in residential housing, commercial buildings, appliances (e.g., refrigerators and ovens), and hot tubs.

In a further alternative embodiment in which a one-part foam composition is utilized, the foam is formed by encapsulating the dry acid powder and the dry, powdered base in a single encapsulating shell, such as the encapsulating shell described in detail above. It is to be appreciated that separately encapsulating the acid and the base is considered to be within the purview of this invention. The encapsulated acid and base are mixed with a functionalized latex solution, at least one crosslinking agent, and optionally one or more of a surfactant, thickener, plasticizer, and/or co-solvent to form a reaction mixture or dispersion. It is to be noted that there is no foaming reaction due to the encapsulation of the acid and base. Consequently, the reactive mixture is stable for extended periods of time. The mixture is of a sufficient viscosity to enable its passage through a spray-type application gun. As with the embodiment discussed previously, the encapsulating shell is destroyed, such as by heat, sonic destruction, shear forces, or other known methods, to release the acid and/or the base. Once the acid and base are released from the encapsulating material, crosslinking between the crosslinking agent and the carboxy groups on the functionalized latex begins and the acid and base react to foam a gas, which initiates the foaming reaction and forms the inventive foam.

Other non-limiting, exemplary one-part foam embodiments of the present invention include a foamable composition where the crosslinking agent and acid is encapsulated, the acid or the base is encapsulated, or every component but the functionalized latex is encapsulated. In each of these embodiments, the foaming and crosslinking reactions begin when the encapsulated material is released from the encapsulating, protective shell, such as by heat, sonic destruction, shear forces, or photo activation. Additionally, the one part-foam compositions may optionally include thickening agents, plasticizers, alcohol co-solvents, foam promoters, opacifiers, accelerators, foam stabilizers, dyes (e.g., diazo or benzimidazolone family of organic dyes), color indicators, gelling agents, flame retardants, biocides, fungicides, algaecides, fillers (aluminum tri-hydroxide (ATH)), and/or conventional blowing agents.

Yet another exemplary embodiment of the invention includes utilizing a phase change blowing agent as the blowing agent package. To form a foam utilizing a phase change blowing agent such as a low boiling point hydrocarbon or inert gas, a functionalized water-soluble or functionalized water-dispersible resin (e.g., functionalized latex or functionalized latex and acrylic solution), crosslinking agent, and phase change blowing agent are pressurized, such as in a pressurized spray-type container. Upon release of the functionalized water-soluble or functionalized water-dispersible resin, the crosslinking agent, and the blowing agent from the pressurized container (e.g., release into atmospheric pressure), the blowing agent changes from a liquid to a gas to initiate the foaming reaction while the crosslinking agent and functionalized resin react to form an internal foam structure. The foaming reaction continues until all of the blowing agent has been converted into a gas.

In use, the inventive foams may be sprayed into either an open cavity, such as between wall studs, or into a closed cavity where it expands to seal any open spaces. The application is desirably a continuous spray process. Alternatively, the foams may be applied in a manner to fill or substantially fill a mold or fed into an extruder or an injection molding apparatus, such as for reaction injection molding (RIM), and used to form items such as cushions, mattresses, pillows, and toys. For example, a functionalized water-soluble or functionalized water-dispersible resin (e.g., functionalized latex or functionalized latex and acrylic solution), a crosslinking agent, and a blowing agent may be mixed and applied to a mold where the crosslinking agent reacts with the functionalized resin while the blowing agent degrades or reacts to form a gas and initiate the foaming reaction.

The foams of the present invention may be used to insulate buildings such as homes from temperature fluctuations outside of the building's envelope. The foams may serve both as a conductive and a convective thermal barrier. The foams of the present invention may also serve as a sealant to air infiltration by filling cracks and/or crevices in a building's roof or walls. Additionally, the foams may be used to seal cracks or crevasses around doors, windows, electric boxes, and the like.

The foams of the present invention are preferably non-structural foams. The soft foam nature of the functionalized water-soluble and functionalized water-dispersible resins allows for easy compaction. As such, the inventive foams have several benefits. For example, there is no post-application waste to an open wall cavity. If there is an overfilling of the cavity, the drywall simply compresses the foam back into the cavity. The inventive foams are giving, so it will not apply a significant pressure to the drywall and little or no bowing or detachment of the drywall will occur.

Another advantage of the foams of the present invention is the safe installation of the foam into cavities. The foams do not release any harmful vapors into the air when applied or sprayed. Therefore, the inventive foams reduce the threat of harm to individuals working with or located near the foam. In addition, the application of the foams is more amenable to the installer as he/she will not need to wear a special breathing apparatus during installation.

Another advantage of the inventive foams is that it can be used in the renovation market, as well as in houses that are occupied by persons or animals. Existing, conventional spray polyurethane foams cannot be used in these applications because of the generation of high amounts of free isocyanate monomers that could adversely affect the occupants of the dwelling. As discussed above, exposure of isocyanate monomers may cause irritation to the nose, throat, and lungs, difficulty in breathing, skin irritation and/or blistering, and a sensitization of the airways.

Yet another advantage of the present invention is that the components of the one-part foam compositions in which the crosslinking agent and base and/or the acid are encapsulated may be mixed and stored in one container without significant reaction until such time that the foam is used. This simplifies the application of the foam because no other components need to be added at the point of application. Instead, the encapsulated components are activated at the point of application.

It is also an advantage of the present invention is that the components of the one-part or two-part foam compositions are carefully chosen to result in a tacky or sticky foam that can be used to hold the fiberglass batt in place when used to fill cracks or crevasses.

The one-part foam compositions are advantageous in they do not require metering within the gun. As a result, a simple spray gun having only one inlet may be utilized to spray the foam compositions. Without a sophisticated pumping system and complex spray gun, producing the inventive one-part foams have low manufacturing costs. In addition, the one-part foamable compositions of the present invention are simpler to use in the field than conventional two-part foams. Therefore, less training is required to correctly use the inventive one-part foam compositions.

Having generally described this invention, a further understanding can be obtained by reference to certain specific examples illustrated below which are provided for purposes of illustration only and are not intended to be all inclusive or limiting unless otherwise specified.

EXAMPLES

Table 1 sets forth a list of proposed components that may be used to make at least one exemplary embodiment of the inventive foam.

TABLE 1

| Proposed Components | | |
|---|---|---|
| Trade Name | Description | Manufacturer |
| Functionalized Latex | | |
| Omnapel | Carboxylated Acrylic Latex | Omnova Solutions, Inc. |
| NovaCryl | Carboxylated Acrylic Latex | Omnova Solutions, Inc. |
| GenFlo | Carboxylated SBR Latex | Omnova Solutions, Inc. |
| Non-Functionalized Latex | | |
| AcryGen DV300 | Acrylic Latex | Omnova Solutions, Inc. |
| Vycar 660x144 | Acrylic Latex | Noveon |
| F-6694 | SBR Latex | Omnova Solutions, Inc. |
| Crosslinking Agents | | |
| XAMA7 | Multifunctional Aziridine | Bayer Chemical |
| Lindride 56 | Methylhexahydrophthalic Anhydride | Lindau Chemical |
| Hardner CD | Carbodiimide | Rotta Corp. |
| YDH 184 | Cycloaliphatic Diepoxide | Thai Epoxy |

TABLE 1-continued

| Proposed Components | | |
|---|---|---|
| Trade Name | Description | Manufacturer |
| Blowing Agents | | |
| | Sodium Bicarbonate/ Citric Acid | Aldrich |
| | Sodium Carbonate/ Citric Acid | Aldrich |
| | Calcium Carbonate/ Sodium Bicarbonate/ Citric Acid | Aldrich |
| Surfactant | | |
| G-5M Triton | Non-ionic Surfactant | Dow Chemical |
| ABEX | Non-ionic Surfactant | Omnova Solutions, Inc. |
| Stanfax 234 | Sodium Lauryl Sulfate | ParaChem |
| Thickening Agents | | |
| Cellosize ® HEC | Hydroxyethyl Cellulose | Dow Chemical |
| Laponite ® | Clay | Southern Clay |
| Cabosil | Fumed Silica | Cabot |
| Plasticizer | | |
| Dioctyl Adipate | | Aldrich |
| Diisoocytyl Adipate | | Aldrich |
| Dimethyl Phthalate | | Aldrich |
| Dioctyl Phthalate | | Aldrich |
| Encapsulants | | |
| | Melamine Formaldehyde | Aldrich |
| Acrylic Solution | | |
| AcryGen 8546 | 26% Acrylic Solution | Omnova Solutions, Inc. |

Prophetic examples of forming the foam, encapsulated catalyst, and the reactive mixture using the exemplary components identified in Table 1 are set forth in Tables 2, 3, and 4.

TABLE 2

| | Two-Part Foam Compositions | | | | | | | | | |
|---|---|---|---|---|---|---|---|---|---|---|
| | Foam 1 (grams) | | Foam 2 (grams) | | Foam 3 (grams) | | Foam 4 (grams) | | Foam 5 (grams) | |
| Component | A-side | B-side | A-side | B-side | A-side | B-side | A-side | B-side | A-side | B-side |
| NovaCryl | | | 900 | | | | | | | |
| Acrylic Solution | | | 18 | | | | | | | |
| Citric Acid | 45 | | 72 | | 45 | | 36 | | 40 | |
| GR-5M Triton | | | 9 | | | | | | | |
| GenFlo | | 900 | | 900 | | 900 | | | | |
| Xama-7 | | | | 27 | | 22.5 | | 90 | | 100 |
| Sodium Bicarbonate | | 63 | | 63 | | 63 | | 25.2 | | 70 |
| Omnapel | 900 | | | | 900 | | 900 | | 1000 | |
| YDH 184 | | | | | | 135 | | | | |
| Hardner CD | | 20 | | | | | | | | |
| ABEX | | | | | | | 22.5 | | 25 | |
| Calcium Carbonate | | | | | | | 65 | | | 70 |
| Dioctyl Adipate | | | | | | | 90 | | | |
| Stanfax 234 | | | | | | | | | 35 | 3 |
| Cabosil | | | | | | | | | 10 | |
| Dimethyl Phthalate | | | | | | | | | | 150 |

TABLE 3

Encapsulated Crosslinking Agent and Blowing Agent

| Component | Encapsulating Materials 1 (grams) | Encapsulating Materials 2 (grams) | Encapsulating Materials 3 (grams) | Encapsulating Materials 4 (grams) |
|---|---|---|---|---|
| Sodium Bicarbonate | 14 | | 7 | 7 |
| Citric Acid | | 14 | 7 | 7 |
| XAMA | 20 | 20 | 20 | |
| Melamine formaldehyde | 10 | 10 | 10 | 10 |

TABLE 4

One-Part Foam Compositions

| Component | Foam 1 (grams) | Foam 2 (grams) |
|---|---|---|
| NovaCryl | 900 | |
| Acrylic Solution | 90 | |
| Citric Acid | 36 | |
| Encapsulating Materials 1 (Table 3) | 64 | |
| Omnapel | | 900 |
| GR-5M Triton | 9 | 9 |
| Encapsulating Materials 3 (Table 3) | | 64 |

The encapsulating materials are made by well-known methods known to these skilled in the art of encapsulation, and as such, will not be described herein.

To form a spray foam using the two-part foam composition of Table 2, the A-side components in Table 2 are mixed together and the B-side components are mixed together. Mixtures of the A-side components and B-side components are pumped separately through hoses to an application gun and combined using a dynamic or static mixer. Reactions between the acid and base (to generate bubbles) and reactions between the functionalized latex and the crosslinking agent (to support the foam structure) occur when the foam components are sprayed from the gun to a desired location, such as cavities.

To form a foamed product using the two-part foam composition of Table 2, the A-side components in Table 2 are mixed together and the B-side components are combined together to form a reaction mixture. The reaction mixture formed of the A-side components and B-side components is mixed with a propeller blade and poured into a mold, where it is left to react. When the foam is hardened (cured), it is released from the mold in the shape of a desired product.

To form a spray foam using the one part foam composition of Table 4, the components in Table 4 are mixed together. The mixtures are pumped through a hose to an application gun. It is envisioned that the application gun will be equipped with a mixing device that destroys the encapsulating shell containing the blowing agent and crosslinking agent. Reactions between the acid and base blowing agent (to generate bubbles) and reactions between the functionalized latex and the crosslinking agent (to support the foam structure) occur when the foam components are sprayed from the gun to a desired location, such as wall cavities.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of forming an elastomeric foam for sealing a building, insulating a building, or both, the method comprising:
    a) delivering a first component of a foamable composition including an acid from an acid-base blowing agent package and a carboxylated acrylic latex, with or without an acrylic solution, the carboxylated acrylic latex present in an amount of 90 to 95% by weight of the first component through a first delivery line to an application device;
    b) delivering a second component of a foamable composition including a base from the acid-base blowing agent package, a plasticizer, and a polyfunctional aziridine present in an amount of 2.7% to 30% by weight of the second component through a second delivery line to said application device;
    c) mixing the first component and the second component within the application device to form a foamable reaction mixture by permitting the polyfunctional aziridine and the carboxylated acrylic latex to chemically react while the acid from the acid-base blowing agent package reacts with the base from the acid-base blowing agent package and initiates a foaming reaction and forms the elastomeric foam; and
    d) applying the foamable reaction mixture to a desired surface of the building;
    wherein one or both of the first component and the second component includes a tackifier;
    wherein the foam hardens to achieve an R-value of 3.5° Fft$^2$ h/BTU per inch to 8° Fft$^2$ h/BTU per inch within two minutes after the first component is contacted with the second component;
    wherein the polyfunctional aziridine is the only crosslinking agent in the foamable composition;
    wherein a molar ratio of carboxy functional groups of the latex to aziridine functional groups of the polyfunctional aziridine is 0.5:1 to 2:1;
    wherein the elastomeric foam has a density of 0.5 to 5 pounds per cubic foot; and
    wherein the elastomeric foam and the foamable reaction mixture are free of isocyanate.

2. The method of claim 1, wherein the second component further comprises a non-functionalized latex.

3. The method of claim 1, wherein at least one of the first component and the second component further includes an alcohol co-solvent.

4. The method of claim 1, wherein the applying step consists of spraying the foamable reaction mixture at a desired location, the desired location being selected from the group consisting of an open cavity, a closed cavity, a crevice, and a crack.

5. The method of claim 1, wherein the first component further includes one of an acrylic acid and a polyacrylic solution.

6. The method of claim 1, wherein the acid is selected from the group consisting of: citric acid, oxalic acid, tartaric acid, succinic acid, fumaric acid, adipic acid, maleic acid, malonic acid, glutaric acid, phthalic acid, metaphosphoric acid, and salts that are convertible into these acids.

7. The method of claim 1, wherein the base is selected from the group consisting of: calcium carbonate, magnesium carbonate, lithium carbonate, sodium carbonate, potassium carbonate, calcium hydrogen carbonate, magnesium hydrogen carbonate, lithium hydrogen carbonate, sodium hydrogen carbonate (sodium bicarbonate), potassium hydrogen carbonate (potassium bicarbonate), and combinations thereof.

8. A method of forming an elastomeric foam on a vertical surface of a building, the method comprising:
(a) mixing together in an application device to form a reaction mixture:
a first component of a foamable composition including an acid from an acid-base blowing agent package and a carboxylated acrylic latex with or without an acrylic solution, the carboxylated acrylic latex present in an amount of 90 to 95% by weight of the first component; and
a second component of a foamable composition including a base from the acid-base blowing agent package, a plasticizer, and a polyfunctional aziridine present in an amount of 2.7% to 30% by weight of the second component;
(b) permitting reactants from the first component and the second component to:
begin a crosslinking reaction between the carboxylated acrylic latex and the polyfunctional aziridine, and
combine the acid and the base to generate a gas to initiate a foaming reaction;
(c) applying the reaction mixture to the vertical surface to form the elastomeric foam thereon,
wherein the foam hardens to achieve an R-value of 3.5° Fft$^2$ h/BTU per inch to 8° Fft$^2$ h/BTU per inch within two minutes after the first component is contacted with the second component;
wherein the polyfunctional aziridine is the only crosslinking agent in the foamable composition;
wherein a molar ratio of carboxy functional groups of the latex to aziridine functional groups of the polyfunctional aziridine is 0.5:1 to 2:1; and
wherein the elastomeric foam has a density of 0.5 to 5 pounds per cubic foot.

9. The method of claim 8, wherein the acid is selected from the group consisting of: citric acid, oxalic acid, tartaric acid, succinic acid, fumaric acid, adipic acid, maleic acid, malonic acid, glutaric acid, phthalic acid, metaphosphoric acid, and salts that are convertible into these acids.

10. The method of claim 9, wherein the base is selected from the group consisting of: calcium carbonate, magnesium carbonate, lithium carbonate, sodium carbonate, potassium carbonate, calcium hydrogen carbonate, magnesium hydrogen carbonate, lithium hydrogen carbonate, sodium hydrogen carbonate (sodium bicarbonate), potassium hydrogen carbonate (potassium bicarbonate), and combinations thereof.

11. A method of forming an elastomeric foam for applying to a vertical surface, the method comprising:
(a) mixing a first component and a second component of a two part foamable composition in an application device to form a reaction mixture;
wherein the first component includes a polyacrylic acid and a carboxylated acrylic latex present in an amount of 90 to 95% by weight of the first component,
wherein the second component includes a base from an acid-base blowing agent package, a plasticizer, and a polyfunctional aziridine crosslinking agent present in an amount of 2.7% to 30% by weight of the second component,
wherein at least one of the first component and the second component includes a thixotropic agent,
wherein the first component and the second component react in the reaction mixture
such that:
the polyfunctional aziridine crosslinks with functional groups on the polyacrylic acid to form a foam support structure in the presence of the thixotropic agent;
the polyacrylic acid reacts with the base of the acid-base blowing agent package to generate a gas for forming the elastomeric foam; and
the polyfunctional aziridine crosslinking agent crosslinks with the carboxylated acrylic latex to begin to cure the foam; and
(b) applying the reaction mixture to the vertical surface;
wherein the elastomeric foam hardens to achieve an R-value of 3.5° Fft$^2$ h/BTU per inch to 8° Fft$^2$ h/BTU per inch within two minutes after the first component is contacted with the second component;
wherein the polyfunctional aziridine is the only crosslinking agent in the foamable composition;
wherein a molar ratio of carboxy functional groups of the latex to aziridine functional groups of the polyfunctional aziridine is 0.5:1 to 2:1;
wherein the elastomeric foam has a density of 0.5 to 5 pounds per cubic foot; and
wherein the elastomeric foam, the foamable composition, and the reaction mixture are free of isocyanate.

* * * * *